(12) United States Patent
Hirota et al.

(10) Patent No.: US 6,178,743 B1
(45) Date of Patent: Jan. 30, 2001

(54) DEVICE FOR REACTIVATING CATALYST OF ENGINE

(75) Inventors: Shinya Hirota; Toshiaki Tanaka, both of Toyota (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/126,587

(22) Filed: Jul. 31, 1998

(30) Foreign Application Priority Data

Aug. 5, 1997 (JP) .................................................... 9-210873

(51) Int. Cl.[7] ................................. F01N 3/00; F01N 7/00
(52) U.S. Cl. ................................. 60/277; 60/295; 60/287; 60/288; 60/289; 60/286; 60/303; 60/277
(58) Field of Search .......................... 60/295, 287, 288, 60/289, 286, 303, 277

(56) References Cited

U.S. PATENT DOCUMENTS

| | | | |
|---|---|---|---|
| 5,201,802 | * | 4/1993 | Hirota et al. ............................ 60/276 |
| 5,271,906 | * | 12/1993 | Yuuki et al. ............................ 60/297 |
| 5,331,809 | * | 7/1994 | Takeshima et al. ..................... 60/288 |
| 5,724,808 | * | 3/1998 | Ito et al. ................................. 60/276 |
| 5,934,072 | * | 8/1999 | Hirota et al. ............................ 60/301 |
| 5,953,907 | * | 9/1999 | Kato et al. .............................. 60/274 |

FOREIGN PATENT DOCUMENTS

| | | |
|---|---|---|
| 5-288042 | 11/1993 | (JP) . |
| 6-200737 | 7/1994 | (JP) . |

* cited by examiner

Primary Examiner—Jeanette Chapman
Assistant Examiner—Sneh Varma
(74) Attorney, Agent, or Firm—Oliff & Berridge, PLC (57) ABSTRACT

A catalyst is housed in a casing arranged in the exhaust passage of the engine. A pressure reducing valve, which is usually closed, is arranged in a bypass passage branching off from the exhaust passage upstream of the casing. The fuel injector usually injects fuel at the combustion stroke or the exhaust stroke to feed hydrocarbon, and $NO_X$ is reduced in the catalyst by the hydrocarbon. When the catalyst is judged to be poisoned, the timing of the secondary fuel injection is advanced with respect to the timing of the usual secondary fuel injection, and the pressure reducing valve is opened to reduce the pressure in the casing. In this way, the catalyst is reactivated.

22 Claims, 7 Drawing Sheets

DEVICE FOR REACTIVATING CATALYST OF ENGINE

BACKGROUND OF THE INVENTION

1. Field of the Invention

The present invention relates to a device for reactivating a catalyst of an engine.

2. Description of the Related Art

Typically, a catalyst arranged in an exhaust passage of an engine is provided with a porous carrier which has an adsorbing function. However, the exhaust gas discharged from the engine includes a soluble organic fraction (SOF) and the SOF is adsorbed in the porous carrier. However, if the SOF is adsorbed in the inner portion of the porous carrier which is spaced apart from the surface of the carrier, it is difficult for the SOF to be desorbed therefrom. Also, a porous carrier such as zeolite has a catalytic function by itself and, therefore, the SOF may be reformed in the porous carrier if the SOF stays in the porous carrier for a long time. If the reformed SOF covers the catalytic metal or blocks the micro pores of the porous carrier, $NO_x$ and the reducing agent cannot reach the catalytic metal and, therefore, the $NO_x$ can not be reduced sufficiently. In this way, the catalyst is poisoned by SOF.

However, the SOF will be burned when the temperature of the porous carrier becomes high in an oxidizing atmosphere. Therefore, Japanese Unexamined Patent Publication No. 6-200737 discloses a device for reactivating a catalyst of a diesel engine in which it is judged whether the catalyst is poisoned by SOF and, if the catalyst is judged to be poisoned, the catalyst is heated so that the SOF in the catalyst is burned, to thereby reactivate the catalyst.

In this device, the SOF existing on or near the surface of the porous carrier is relatively easily heated and thus burned. However, it is difficult to heat the SOF existing in the inner portion of the porous carrier to a temperature where the SOF can be burned. Namely, it is difficult for the catalyst to be reactivated sufficiently.

SUMMARY OF THE INVENTION

An object of the present invention is to provide a device for reactivating a catalyst of an engine capable of reactivating the catalyst sufficiently from the poisoning thereof, to thereby purify the exhaust gas sufficiently.

According to the present invention, there is provided a device for reactivating a catalyst of an engine having an exhaust passage, the catalyst being housed in a catalyst casing arranged in the exhaust passage, the device comprising: heating means which is able to heat the catalyst; pressure reducing means which is able to reduce the pressure in the catalyst casing; and reactivating means for controlling the heating means and the pressure reducing means to heat the catalyst and reduce the pressure in the catalyst casing to reactivate the catalyst.

The present invention may be more fully understood from the description of the preferred embodiments of the invention as set forth below, together with the accompanying drawings.

DESCRIPTION OF THE PREFERRED EMBODIMENTS

Figure 1:
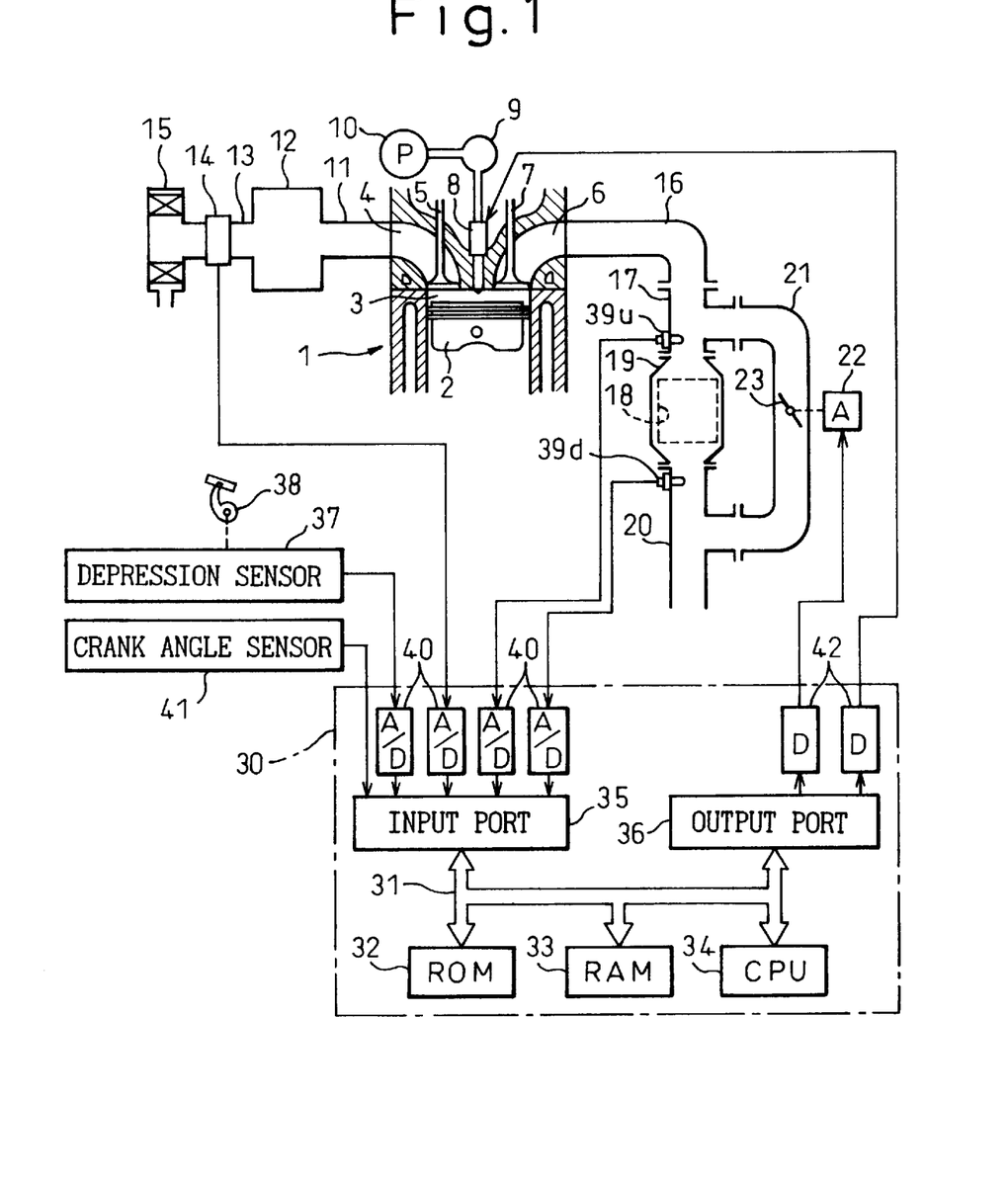
FIG. 1 is a general view of an engine.

FIG. 1 illustrates a case where the present invention is applied to a diesel engine. Alternatively, the present invention may be applied to a spark-ignition engine.

Referring to FIG. 1, a reference numeral 1 designates an engine body, 2 designates a piston, 3 designates a combustion chamber, 4 designates an intake port, 5 designates an intake valve, 6 designates an exhaust port, 7 designates an exhaust valve, and 8 designates a fuel injector, of an electromagnetic type, for injecting fuel directly into the combustion chamber 3. The fuel injectors 8 are connected to a fuel pump 10 via a common fuel accumulator 9. This allows the fuel injectors 8 to inject fuel at a plurality of times during one combustion cycle of the corresponding cylinders. The intake ports 4 of the cylinders are connected to a common surge tank 12 via corresponding branches 11, and the surge tank 12 is connected to an air-flow meter 14 and an air cleaner 15 via an intake duct 13. On the other hand, the exhaust ports 6 of the cylinders are connected to a common exhaust manifold 16. The manifold 16 is connected to a casing 19, housing a catalyst 18 therein, via an exhaust pipe 17. The casing 19 is connected to an exhaust pipe 20. A bypass pipe 21 is provided for connecting to the pipes 17 and 20 to each other to bypass the catalyst 18. A pressure reducing valve 23, driven by an actuator 22, is disposed in the bypass pipe 21, and is usually kept closed. Note that the fuel injectors 8 and the actuator 22 are controlled by output signals from an electronic control unit 30.

The electronic control unit (ECU) 30 is constructed as a digital computer and comprises a read-only memory (ROM) 32, a random-access memory (RAM) 33, a CPU (microprocessor) 34, an input port 35, and an output port 36, which are interconnected with each other via a bidirectional bus 31. The air-flow meter 14 generates an output voltage in proportion to the amount of the intake air Ga, and an depression sensor 37 generates an output voltage in proportion to a depression DEP of an acceleration pedal 38. Further, a temperature sensor 39u is arranged in the exhaust pipe 17 adjacent to the inlet of the casing 19, which generates an output voltage in proportion to the temperature of the exhaust gas flowing to the casing 19, and a temperature sensor 39d is arranged in the exhaust pipe 20 adjacent to the outlet of the casing 19, which generates an output voltage in proportion to the temperature of the exhaust gas exhausted from the casing 19. The output voltages of the sensors 14, 37, 39u, and 39d are input to the input port 35 via corresponding AD converters 40, respectively. The input port 35 is also connected to a crank angle sensor 41, which generates a pulse whenever a crankshaft is turned by, for example, 30 degrees. According to these pulses, the CPU 34 calculates the engine speed N. The output port 36 is connected to the fuel injectors 8 and the actuator 22 via corresponding drive circuits 42, respectively.

In the engine shown in FIG. 1, the catalyst 18 is comprised of a precious metal, such as platinum Pt, palladium Pd, rhodium Rh, and iridium Ir, or a transition metal, such as copper Cu, iron Fe, cobalt Co, and nickel Ni, carried on a porous carrier, such as zeolite, ferrierite, mordenite, alumina $Al_2O_3$, silica-alumina $SiO_2.Al2O_3$, activated carbon, and titania $TiO_2$, by the ion changing process. For the zeolite, a silica-rich zeolite such as ZSM-5 zeolite may be used. In the oxidizing atmosphere including the reducing agent, such as hydrocarbon HC and carbon monoxide CO, the catalyst 18 selectively reacts $NO_X$ with the HC and the CO, to thereby reduce the $NO_X$ to nitrogen $N_2$. Namely, the catalyst 18 can reduce $NO_X$ even in the oxidizing atmosphere if the inflowing exhaust gas includes the reducing agent.

In the diesel engine shown in FIG. 1, the air-fuel mixture is burned with an excess air to reduce the undesirable smoke and particulate discharged from the engine. Thus, the catalyst 18 is always kept in the oxidizing atmosphere. As a result, $NO_X$ is effectively reduced in the catalyst 18.

In this case, unburned HC and CO discharged from the engine can act as a reducing agent. However, the amount of $NO_X$ to be purified is much larger than that of the unburned HC and CO discharged from the engine, and the amount of reducing agent will be too little to purify the $NO_X$ sufficiently. Thus, in the engine shown in FIG. 1, the reducing agent is secondarily fed to the catalyst 18, to thereby avoid a shortage of the reducing agent with respect to $NO_X$.

To feed the reducing agent to the catalyst 18 secondarily, there may be provided a reducing agent feeding device in the exhaust passage upstream of the catalyst 18 for feeding the reducing agent. Further, a hydrocarbon such as gasoline, isooctane, hexane, heptane, gas oil, and kerosine, or hydrocarbon which can be stored in a liquid form, such as butane or propane, or hydrogen $H_2$ or ammonia $NH_3$ can be used as the reducing agent. However, in the engine shown in FIG. 1, fuel of the engine (hydrocarbon) is used as the reducing agent, and the reducing agent is fed to catalyst 18 by the fuel injector 8 injecting fuel at the combustion stroke or the exhaust stroke of the engine. The fuel injection at the combustion stroke or the exhaust stroke is different from a usual fuel injection to obtain the engine output, and does not contribute to the engine output. This technique does not require an additional feeding device and an additional tank for the reducing agent. Note that the fuel injection at the combustion stroke or the exhaust stroke is referred to as a secondary fuel injection, hereinafter. The secondary fuel injection may be performed at 150° crank angle after the top dead center of the compression stroke, for example.

As mentioned above, the catalyst 18 is comprised of a porous carrier and, thus, is able to adsorb hydrocarbon (the reducing agent) by physical adsorption. Namely, the catalyst 18 may act as a hydrocarbon (reducing agent) adsorbent. In this case, the HC adsorbing capacity of the catalyst 18 becomes larger as the temperature of the catalyst 18 becomes lower. Therefore, it can be considered that the catalyst 18 has a hydrocarbon adsorption and desorption function in which it stores the hydrocarbon in the inflowing exhaust gas when the temperature of the catalyst 18 becomes lower, and desorbs the adsorbed hydrocarbon when the temperature of the catalyst 18 becomes higher.

$NO_X$ is thus reduced in the catalyst 18 by both hydrocarbon in the inflowing exhaust gas and that desorbed from the catalyst 18. However, the inventors of the present application have found that the $NO_X$ reduction by HC desorbed from the catalyst 18 is superior to that by HC in the inflowing exhaust gas.

The reason why hydrocarbon desorbed from the catalyst 18 provides a superior $NO_X$ reduction is still unclear. However, it may be that this is because the $NO_X$ reduction is performed according to the following mechanism. Namely, referring to FIG. 2, which illustrates a case where the catalyst 18 is comprised of platinum Pt carried on the porous carrier, first, hydrocarbon HC in the inflowing exhaust gas is temporarily adsorbed in the porous carrier. Then, the adsorbed HC moves through the porous carrier, and is then desorbed from the carrier when, for example, the temperature of the catalyst 18 becomes higher. In this case, the HC is released from the carrier at the surface of the Pt particle, or is released from the carrier very close to the Pt particles, and then adheres to the surface of the Pt particle. Namely, a large amount of HC will exist on the surface of the Pt particle, by causing the catalyst 18 to adsorb HC therein temporarily and then to desorb the adsorbed HC therefrom. On the other hand, if $NO_X$ and HC exist on the surface of the Pt particle adjacent to each other, the HC reduces the $NO_X$. Accordingly, a large amount of HC on the surface of the Pt particle reduces a large amount of $NO_X$ in the inflowing exhaust gas.

Figure 2:
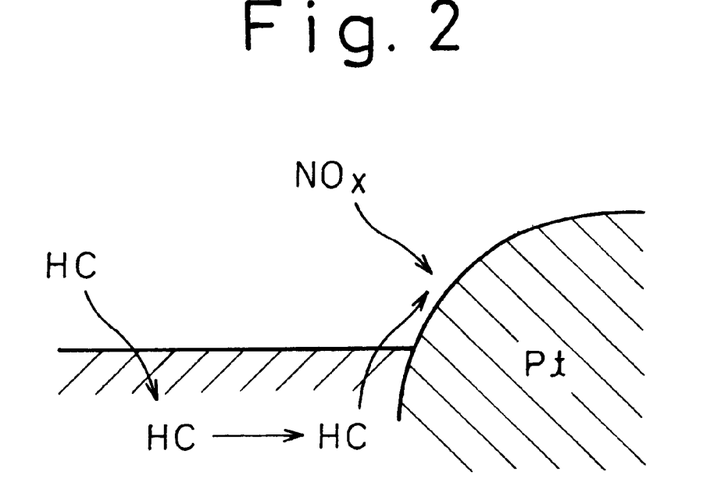
FIG. 2 is a schematic illustration for explaining the hydrocarbon adsorption and desorption and the $NO_x$ reduction in the catalyst.

Contrarily, HC flowing through the micro pores of the carrier without being adsorbed in the carrier does not necessarily reach the surface of a Pt particle. Thus, in this case, the amount of HC on the surface of the Pt particle is not large and, therefore, $NO_X$ is not necessarily reduced sufficiently.

In this way, in the engine shown in FIG. 1, the $NO_X$ reduction by HC desorbed from the catalyst 18, as well as the $NO_X$ reduction by HC in the inflowing exhaust gas, is performed in the catalyst 18 and, therefore, good $NO_X$ purification in the catalyst 18 is obtained.

However, as mentioned at the beginning, the exhaust gas exhausted from the engine includes SOF, and the SOF is also adsorbed in the catalyst 18 together with HC. Moreover, if the SOF is adsorbed in the inner portion of the porous carrier which is spaced apart from the surface of the carrier, it is difficult to desorb the SOF therefrom. Also, the porous carrier such as zeolite has a catalytic function by itself and, therefore, the SOF may be reformed in the porous carrier if the SOF stays in the porous carrier for a long time. If the reformed SOF covers the catalytic metal or blocks the micro pores of the porous carrier, $NO_X$ and the reducing agent cannot reach the catalytic metal and, therefore, the $NO_X$ can not be reduced sufficiently. In this way, the catalyst 18 is poisoned by SOF.

Further, the exhaust gas exhausted from the engine includes sulphur containing components such as $SO_2$, because fuel and the lubricating oil of the engine includes sulphur containing components. The sulphur containing components are also adsorbed in the porous carrier of the catalyst 18. However, if the catalyst 18 includes the alkali component, such as alkali earth metals such as barium Ba, the sulphur containing components adsorbed in the carrier form a sulphate, with the alkali component, in the form of $BaSO_4$, for example. The sulphate is chemically stable and, thus, is hardly desorbed or released from the carrier. This reduces the HC adsorbing capacity of the carrier, or causes blockage of the micro pores of the carrier. In this way, the catalyst 18 is poisoned or deactivated by the sulphur containing component.

However, the SOF will be burned when the temperature of the porous carrier becomes higher in an oxidizing atmosphere, and the sulphate will be resolved and released from the carrier in the form of $SO_2$, for example, when the temperature of the carrier becomes high. Therefore, in the engine shown in FIG. 1, it is judged whether the catalyst 18 is poisoned by SOF or the sulphur containing component, and, when the catalyst 18 is judged to be poisoned, the catalyst 18 is heated so that the SOF is burned or the sulphur containing component is resolved, to thereby reactivate the catalyst 18.

In this case, the SOF or the sulphur containing component existing on or near the surface of the porous carrier is relatively easily heated and thus burned or resolved. However, it is difficult to heat the SOF or the sulphur containing component existing in the inner portion of the porous carrier which is spaced apart from the surface of the carrier to a temperature where the SOF can be burned or the sulphur containing component can be resolved. Therefore, the catalyst 18 must be heated for a long time and, thus, a large amount of energy is required.

On the other hand, the adsorbing capacity of the porous carrier depends on the pressure in the casing 19. Namely, the adsorbing capacity of the carrier becomes lower as the pressure in the casing 19 becomes lower. Further, the resolving temperature of the sulphate depends on the pressure in the casing 19. Namely, the resolving temperature of the sulphate becomes lower as the pressure in the casing 19 becomes lower. Accordingly, the SOF adsorbed in the carrier is more easily desorbed and the sulphate adsorbed in the carrier is more easily resolved when the pressure in the casing 19 is reduced.

Therefore, in the engine shown in FIG. 1, the catalyst 18 is heated while the pressure in the casing 19 is reduced when the catalyst 18 is to be reactivated. As a result, the SOF existing in the inner portion of the carrier is released from the carrier or is moved nearer to the surface of the carrier and, therefore, is easily heated and burned. Also, the resolving temperature of the sulphate is lowered and, therefore, the sulphate in the carrier is easily resolved. Accordingly, the catalyst 18 is easily reactivated.

When the engine load or the engine speed is low, the pressure in the casing 19 is low. Thus, it may be considered that heating the catalyst 18 when the engine load or the engine speed is low will reactivate the catalyst 18 sufficiently. However, the pressure drop obtained by such a usual engine operation is not sufficient to release the SOF from the catalyst 18 sufficiently, or to make the resolving temperature of the sulphate sufficiently low. Therefore, in the present embodiment, there is provided the bypass pipe 21 branching off from the exhaust passage upstream of the casing 19, and the pressure reducing valve 23 is arranged in the bypass pipe 21. When the catalyst 18 is to be reactivated, the pressure reducing valve 23 is fully opened to reduce the pressure in the casing 19. Namely, almost all of the exhaust gas discharged from the engine flows through the bypass pipe 21 when the valve 23 is fully opened and, therefore, the pressure in the casing 19 is made much lower than the usual, i.e., is reduced to approximately atmospheric pressure, for example.

On the other hand, the adsorbing capacity of the porous carrier becomes smaller as the temperature of the carrier becomes higher, as mentioned above. Thus, it may be considered that SOF is sufficiently released from the catalyst 18 when the temperature of the catalyst is made higher. However, the adsorbing capacity of the carrier in which physical adsorption is performed depends on the pressure, rather than on the temperature. Namely, the SOF is not sufficiently released from the catalyst 18 even when the temperature of the catalyst is high, if the pressure in the casing 19 is high, and is sufficiently released even when the temperature of the catalyst is low, if the pressure in the casing 19 is low. Further, the time required to reduce the pressure in the entire of the casing 19 to a certain pressure is much shorter than the time required to increase the temperature of all of the catalyst to a certain temperature. Therefore, in the embodiment according to the present invention, the pressure in the casing 19 is reduced when the catalyst 18 is to be activated.

Next, the method for reactivating the catalyst in the embodiment according to the present invention will be explained in more detail.

Figure 3:
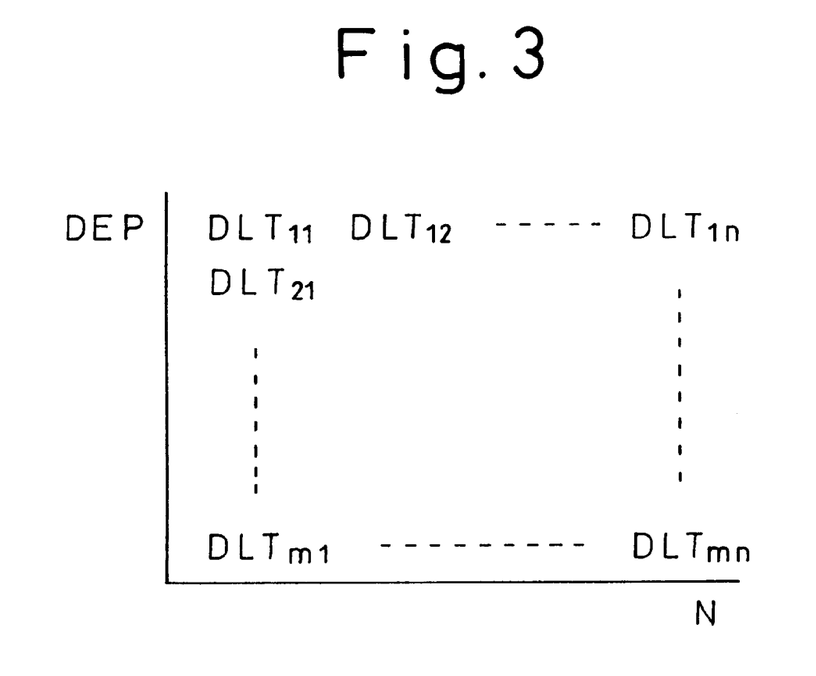
FIG. 3 is a map illustrating the set value DLT.

First, the method for detecting whether the catalyst 18 is poisoned by SOF or the sulphur containing component will be explained. In the present embodiment, it is detected whether the catalyst 18 is poisoned based on the temperature difference between the temperature of the exhaust gas flowing to the catalyst 18, i.e., the inlet temperature Tu, and the temperature of the exhaust gas discharged from the catalyst 18, i.e., the outlet temperature Td. Namely, if the catalyst 18 is not poisoned, the oxidizing reaction of HC fed by the secondary fuel injection actively occurs in the catalyst 18. In this case, the outlet temperature Td is higher than the inlet temperature Tu, and the temperature difference (Td–Tu) between the outlet temperature Td and the inlet temperature Tu is kept larger than a threshold DLT. Contrarily, if the catalyst 18 is poisoned, the oxidizing reaction of HC hardly occurs and, therefore, the temperature difference (Td–Tu) is lower than the threshold DLT. Therefore, in the present embodiment, the threshold DLT is found in advance in accordance with the engine operating condition, for example, it is judged that the catalyst is poisoned when the temperature difference (Td–Tu) is smaller than the threshold. Note that the threshold DLT is stored in the ROM 32 in advance, in the form of a map shown in FIG. 3 as a function of the depression DEP of the acceleration pedal and the engine speed N, for example.

Next, the method for heating the catalyst 18 will be explained. When fuel is secondarily fed to the combustion chamber 3 as in the present embodiment, the fuel fed by the secondary fuel injection is partly burned in the combustion chamber 3 and, thus, the temperature of the exhaust gas discharged from the combustion chamber 3 is increased. In this case, the amount of HC (fuel) burned in the combustion chamber 3 becomes larger as the secondary fuel injection timing becomes earlier within the combustion stroke or the exhaust stroke. Namely, the temperature of the exhaust gas flowing to the catalyst 18 becomes higher as the secondary fuel injection timing becomes earlier. When the temperature of the exhaust gas flowing to the catalyst 18 becomes higher, the temperature of the catalyst 18 also becomes higher. When the temperature of the catalyst 18 becomes higher to a certain degree, some of the HC fed by the secondary fuel injection reacts with oxygen $O_2$, rather than $NO_X$, in the catalyst 18. Namely, the HC fed by the secondary fuel injection acts as the catalyst heating fuel and is burned in the catalyst 18. As a result, the temperature of the catalyst 18 is rapidly increased. Therefore, in the present embodiment, when the catalyst 18 is to be heated, the secondary fuel injection timing is advanced with respect to the usual timing, within the combustion stroke or the exhaust stroke. Namely, when the catalyst 18 is to be heated, the secondary fuel injection timing is set at approximately 90° to 120° crank angle after the top dead center of the compression stroke. This removes the need for additional elements for heating the catalyst 18, as well as the complicated control. The amount of energy required to heat the catalyst 18 is also reduced.

Note that an additional fuel feeding device may provided in the exhaust passage upstream of the catalyst 18 for feeding the catalyst heating fuel to the catalyst 18. Further, a hydrocarbon such as gasoline, isooctane, hexane, heptane, gas oil, and kerosine, or a hydrocarbon which can be stored in a liquid form, such as butane or propane, or hydrogen $H_2$ or ammonia $NH_3$ can be used as the catalyst heating fuel. However, feeding the catalyst heating fuel by the secondary fuel injection removes the need for an additional feeding device and an additional tank for the catalyst heating fuel.

When the catalyst 18 is heated to a temperature where SOF can be burned and the sulphur containing component can be resolved, the outlet temperature Td which represents the temperature of the catalyst 18 is higher than a first predetermined temperature T1. Therefore, in the present embodiment, when the outlet temperature Td becomes higher than the first predetermined temperature T1, the secondary fuel injection is stopped, i.e., the heating of the catalyst 18 is stopped. Next, the pressure reducing valve 23 is opened. Thus, the pressure in the casing 19 is reduced and, therefore, almost all of the SOF adsorbed in the catalyst 18 is released from the catalyst 18 in a short time. At this time, the temperature of the catalyst 18 is kept higher than a temperature at which the SOF can be burned and the catalyst 18 is kept in the oxidizing atmosphere. Therefore, the released SOF is sufficiently burned. Further, at this time, almost all of the sulphur containing component is resolved and released from the catalyst 18 in a short time. Accordingly, the catalyst 18 is reactivated. Note that in the present embodiment, the first predetermined temperature T1 is set to 600° C. Alternatively, the first predetermined temperature T1 may be set to 400° C. if the poisoning by the sulphur containing component is not considered.

When the SOF is burned, the outlet temperature Td is kept relatively high. However, the outlet temperature Td becomes lower gradually, when the combustion of the SOF is finished. Therefore, when the outlet temperature T1 becomes lower than a second predetermined temperature T2 which is set lower than the first predetermined temperature T1, it is judged that the reactivation of the catalyst 18 is finished. The second predetermined temperature T2 is set to 300° C., for example.

Figure 4:
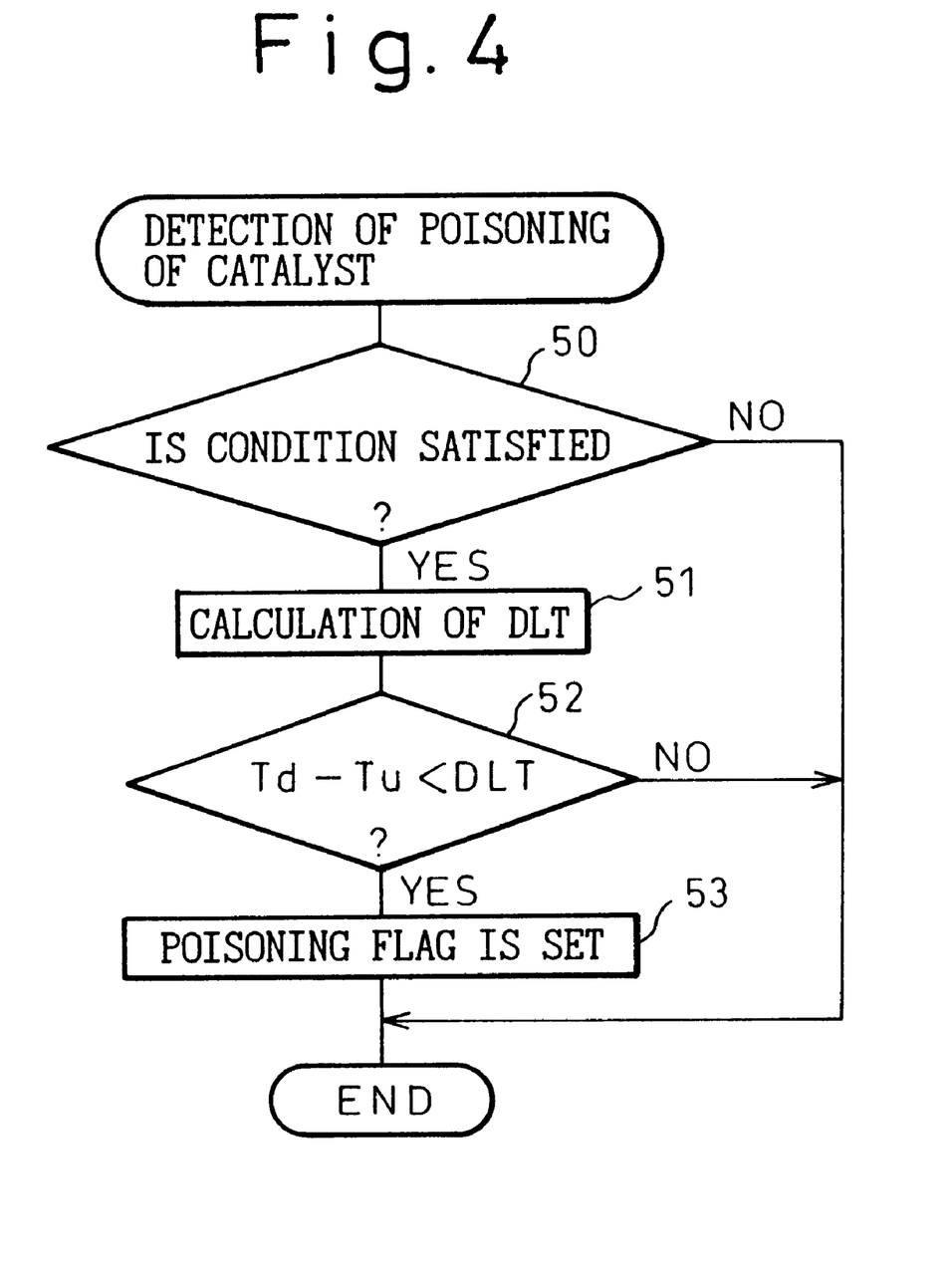
FIG. 4 shows a flowchart for the detection of the poisoning of the catalyst.

FIG. 4 shows a routine for executing the method for detecting the poisoning of the catalyst 18, mentioned above. The routine is executed by interruption every predetermined time.

Referring to FIG. 4, first, in step 50, it is judged whether a condition for detecting the poisoning of the catalyst 18 is satisfied. In the present embodiment, the condition is judged to be satisfied when the temperature of the catalyst 18 is higher than its active temperature and a constant time has passed from the previous reactivation process of the catalyst 18, otherwise the condition is judged not to be satisfied. When the condition is judged not to be satisfied, the processing cycle is ended. When the condition is judged to be satisfied, the routine goes to step 51, where the threshold DLT is calculated based on the present engine operating condition, from the map shown in FIG. 3. In the following step 52, it is judged whether the temperature difference (Td−Tu) between the outlet temperature Td and the inlet temperature Tu is smaller than the threshold DLT. When (Td−Tu)≧DLT, the catalyst 18 is judged not to be poisoned and the processing cycle is ended. Contrarily, when (Td−Tu)<DLT, the catalyst 18 is judged to be poisoned and the routine goes to step 53, where a poisoning flag is set. Then, the processing cycle is ended. The poisoning flag, which is reset initially, is set when the catalyst 18 is judged to be poisoned, and is reset again when the reactivation of the catalyst 18 is finished.

Figure 5:
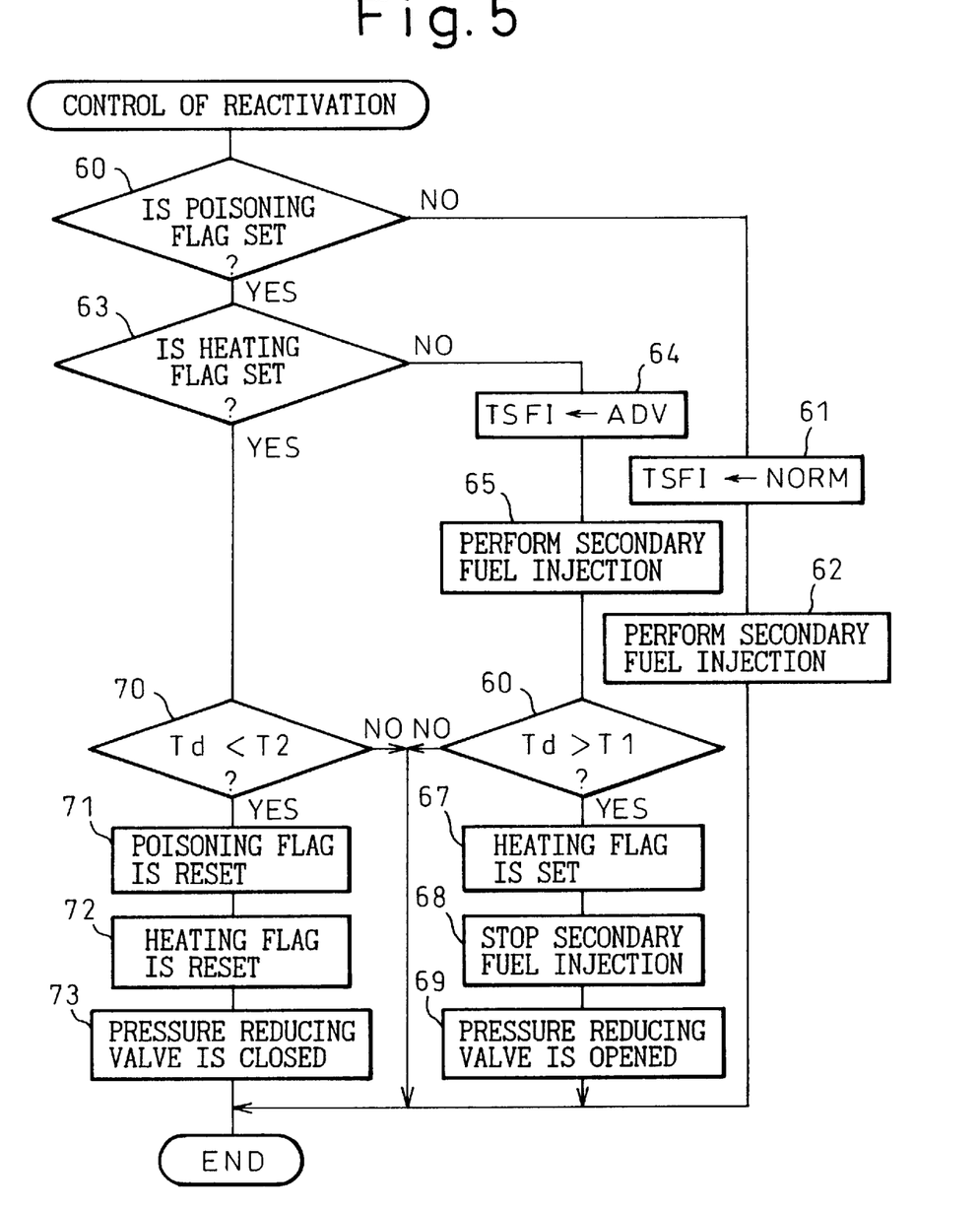
FIG. 5 shows a flowchart for controlling the reactivation.

FIG. 5 shows a routine for controlling the reactivation of the catalyst 18. The routine is executed by interruption every predetermined time.

Referring to FIG. 5, first, in step 60, it is judged whether the poisoning flag mentioned above is set. When the poisoning flag is reset, the routine goes to step 61, where the secondary fuel injection timing TSFI is set to NORM. This NORM is 150° crank angle after the top dead center of the compression stroke, for example. In the following step 62, the secondary fuel injection is performed. Then, the processing cycle is ended. Accordingly, the HC as the reducing agent is fed to the catalyst 18. Note that the pressure reducing valve 23 is closed at this time.

When the poisoning flag is set in step 60, the routine goes to step 63, where it is judged whether a heating flag is set. The heating flag is set when the heating of the catalyst 18 is finished, and is reset otherwise. The heating flag is reset when it is the first time for the routine to go to step 63 after the poisoning flag is set. Thus, the routine goes to step 64, where the secondary fuel injection timing TSFI is set to ADV. This ADV is advanced with respect to NORM, and is 90° crank angle after the top dead center of the compression stroke, for example. In the following step 65, the secondary fuel injection is performed. Accordingly, the catalyst 18 is heated.

In the following step 66, it is judged whether the outlet temperature T1 is higher than the first predetermined temperature T1. When Td≦T1, the processing cycle is ended. Contrarily, when Td>T1, the routine goes to step 67, where the heating flag is set. In the following step 68, the secondary fuel injection is stopped. In the following step 69, the pressure reducing valve 23 is opened. Then, the processing cycle is ended. Namely, when the temperature of the catalyst 18 is heated to a temperature where the SOF can be burned and the sulphur containing component can be resolved, the heating of the catalyst 18 is stopped, and the burning of the SOF and the resolving of the sulphur containing component are started.

When the heating flag is set, the routine goes from step 63 to step 70, where it is judged whether the outlet temperature Td is lower than the second predetermined temperature T2. When Td≧T2, the processing cycle is ended. Contrarily, when Td<T2, the reactivation of the catalyst 18 is judged to be finished, and the routine goes to step 71, where the poisoning flag is reset and, in the following step 72, the heating flag is also reset. In the following step 73, the pressure reducing valve 23 is closed.

Figure 6:
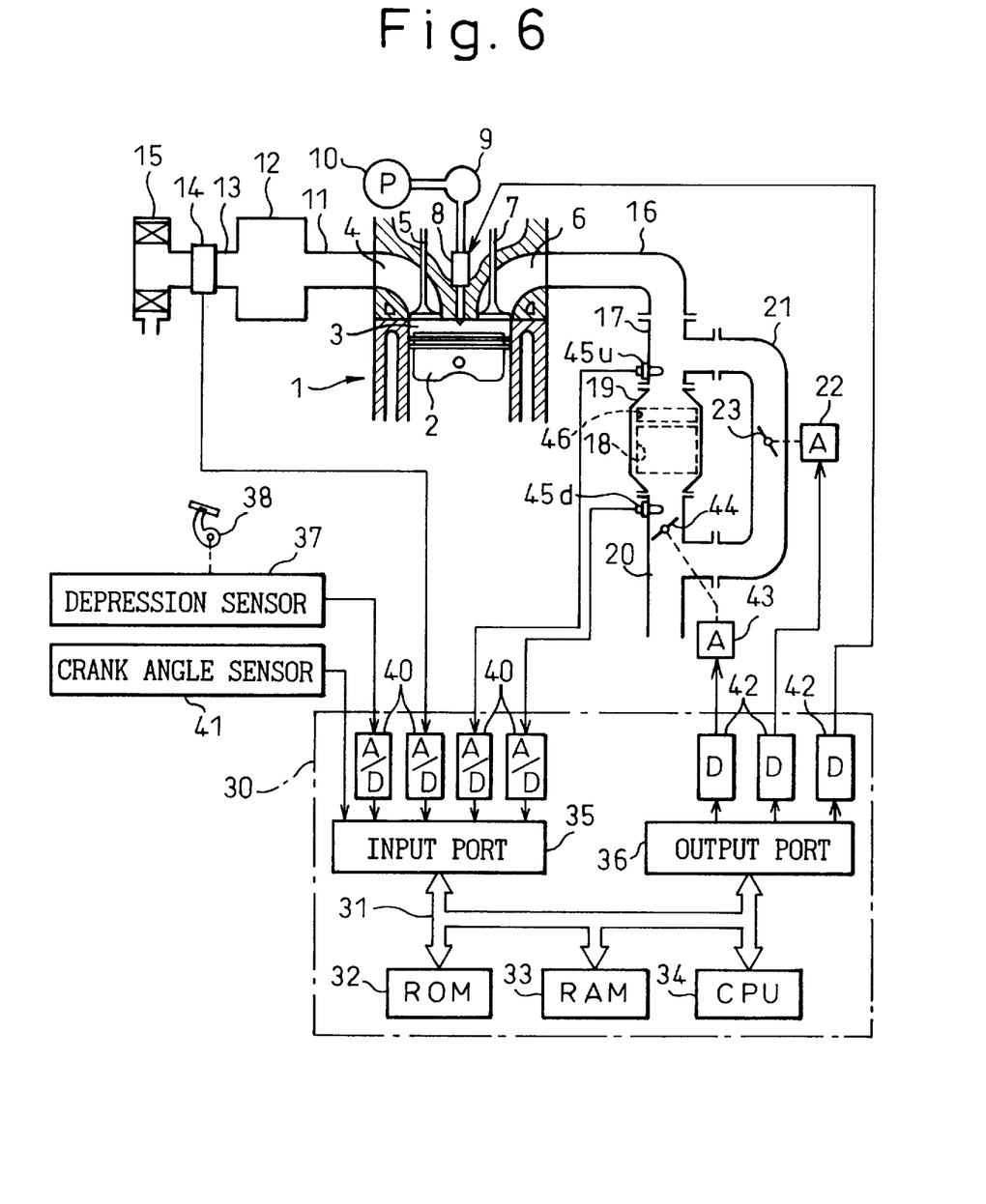
FIG. 6 is a general view of an engine according to another embodiment of the present invention.

FIG. 6 illustrates another embodiment.

Referring to FIG. 6, a pressure increasing valve 44 is arranged in the exhaust pipe 20 upstream of the exhaust gas outlet of the bypass pipe 21, and is driven by an actuator 43. The pressure increasing valve 44 is usually kept opened, and the pressure in the casing 19 is increased when the valve 44 is closed. The valve 44 may be used as an exhaust gas break. The output port 36 of the ECU 30 is connected to the actuator 43 via a corresponding drive circuit 42, and the actuator 43 is controlled by output signals from the ECU 30. Further, an upstream side concentration sensor 45u, which generates an output voltage in proportion to the concentration of $NO_X$ in the exhaust gas flowing to the casing 19, is attached to the exhaust pipe 17 adjacent to the inlet of the casing 19, and a downstream side concentration sensor 45d, which generates an output voltage in proportion to the concentration of $NO_X$ in the exhaust gas discharged from the casing 19, is attached to the exhaust pipe 20 adjacent to the outlet of the casing 19. The output voltages of the sensors 45u and 45d are input to the input port 35 via the corresponding AD converters 40, respectively.

Further, as shown in FIG. 6, an adsorbent 46 which is able to adsorb hydrocarbon HC is housed in the casing 19 upstream of the catalyst 18. The adsorbent 46 is comprised of a porous material without a catalytic function such as silica $SiO_2$, or with a low catalytic function. The adsorbing capacity of the adsorbent 46 becomes smaller as the pressure in the casing 19 becomes lower. Thus, it can be considered that the adsorbent 46 has a HC adsorbing and desorbing ability in which it stores HC in the inflowing exhaust gas therein when the pressure in the casing 19 becomes higher, and desorbs or releases the adsorbed HC therefrom when the pressure in the casing 19 becomes lower.

In the embodiment shown in FIG. 1, the secondary fuel injection timing is advanced to increase the temperature of the exhaust gas flowing to the catalyst 18 so that the fuel fed by the secondary fuel injection acts as the catalyst heating fuel and is burned in the catalyst 18, to thereby heat the catalyst 18. In this case, if the amount of the catalyst heating fuel fed to the catalyst 18 per unit time is increased, the time required to heat the catalyst 18 is shortened and, therefore, the time required to reactivate the catalyst 18 is also shortened. However, the amount of fuel to be fed by one fuel injection is limited, and the number of the secondary fuel injections per unit time depends on the engine speed. Thus, if the catalyst heating fuel is fed by the secondary fuel injection, it may be impossible to feed a large amount of the catalyst heating fuel to the catalyst per unit time.

On the other hand, when the pressure in the casing 19 is reduced, almost all of HC adsorbed in the adsorbent 46 is released in a short time and, then, reaches the catalyst 18. Further, the pressure in the casing 19 is reduced when the catalyst 18 must be reactivated, as in the embodiment shown in FIG. 1. Therefore, in the present embodiment, HC is previously adsorbed in the adsorbent 46 before the pressure in the casing 19 is reduced to reactivate the catalyst 18, and the HC is fed from the adsorbent 46 to the catalyst 18 when the pressure in the casing 19 is reduced to reactivate the catalyst 18. In this case, the HC released from the adsorbent 46 reaches the catalyst 18 and, then, is burned in the catalyst 18. Accordingly, the catalyst 18 is rapidly heated. Note that the absorbent 46 may be arranged in the catalyst 18, i.e., may be formed integrally with the catalyst 18.

In order to release a large amount of HC from the adsorbent 46, it is necessary for a large amount of HC to be adsorbed in the adsorbent 46 in advance. The adsorbing capacity of the adsorbent 46 becomes larger as the pressure in the casing 19 becomes larger, as mentioned above. Therefore, in the present embodiment, when the catalyst 18 is judged to be poisoned, first, the pressure increasing valve 44 is closed for a constant time to increase the pressure in the casing 19 and, at the same time, the secondary fuel injection is performed so that a large amount of HC is adsorbed in the adsorbent 46.

At this time, the secondary fuel injection timing is advanced to preheat the catalyst 18. Therefore, when the HC is fed from the adsorbent 46 to the catalyst 18, the HC rapidly starts to be burned.

In the present embodiment, it is judged whether the catalyst 18 is poisoned based on the concentration difference between the concentration of $NO_X$ in the exhaust gas flowing to the catalyst 18 and the concentration of $NO_X$ in the exhaust gas discharged from the catalyst 18. Namely, if the catalyst 18 is poisoned, a part of $NO_X$ flowing to the catalyst 18 is discharged from the catalyst 18 without being reduced. Therefore, in the present embodiment, first, the difference DCN (=CNU−CND) between the concentration CNU of $NO_X$ at the inlet of the catalyst 18 detected by the upstream-side sensor 45u and the concentration CND of $NO_X$ at the outlet of the catalyst 18 detected by the downstream-side sensor 45d is found, and the average value AVE of the difference DCN is found. Then, when the average value AVE is smaller than a predetermined value CN1, the catalyst 18 is judged to be poisoned by SOF or the sulphur containing component.

Figure 7:
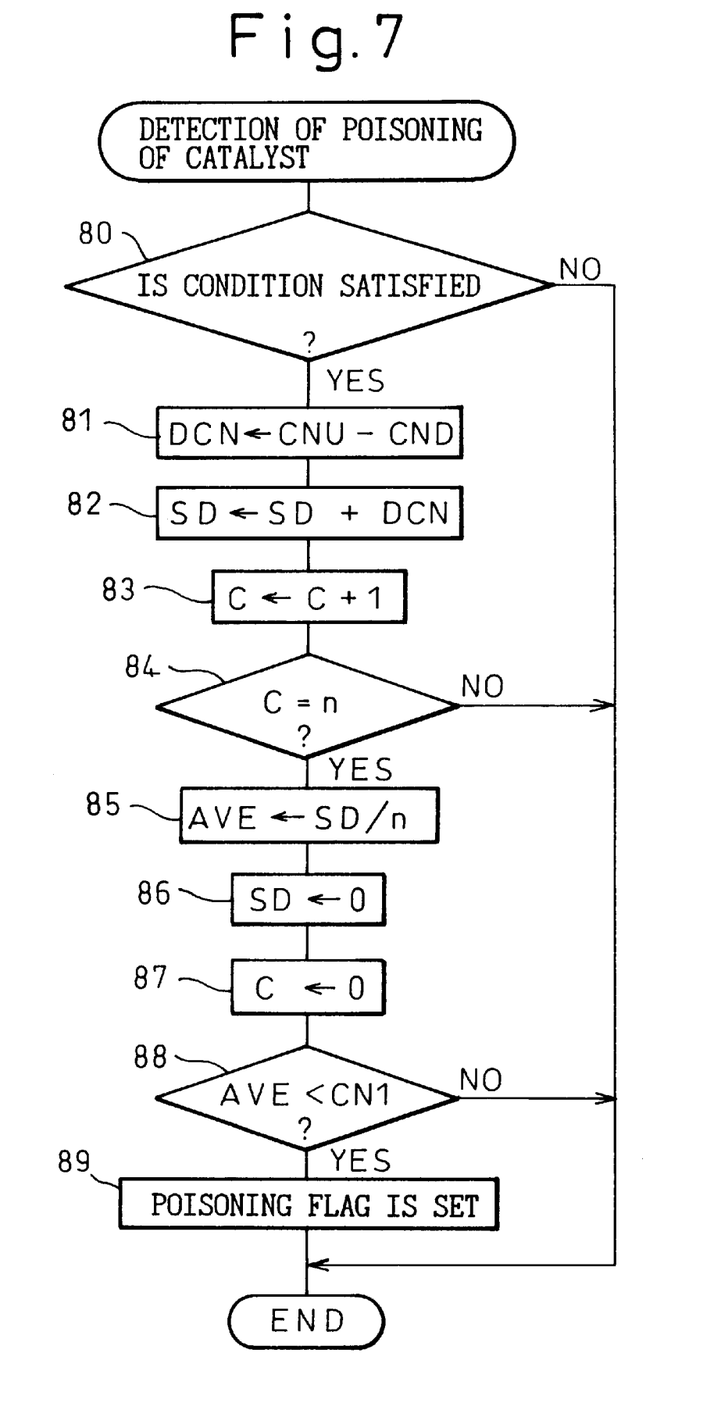
FIG. 7 shows a flowchart for the detection of the poisoning of the catalyst according to the embodiment in FIG. 6.

Next, the present embodiment will be explained, in more detail, with reference to FIGS. 7 and 8. The routines shown in FIGS. 7 and 8 are executed by interruption every predetermined time, respectively.

Referring to FIG. 4, which shows a routine for detecting the poisoning of the catalyst 18, first, in step 80, it is judged whether a condition for detecting the poisoning of the catalyst 18 is satisfied. The condition is judged to be satisfied when the temperature of the catalyst 18 is higher than its active temperature and a constant time has passed from the previous reactivation process of the catalyst 18, otherwise the condition is judged not to be satisfied. When the condition is judged not to be satisfied, the processing cycle is ended. When the condition is judged to be satisfied, the routine goes to step 81.

In step 81, the difference DCN (=CNU−CND) between the $NO_X$ concentration CNU at the inlet of the catalyst 18 and the $NO_X$ concentration CND at the outlet of the catalyst 18 is calculated. In the following step 82, the cumulative value SD of the difference DCN is calculated (SD=SD+DCN). In the following step 83, the counter value C which represents the number of the cumulation of the difference DCN is incremented by 1. In the following step 84, it is judged whether the counter value C equals the constant n. When C<n, the processing cycle is ended. Contrarily, when C=n, the routine goes to step 85, where the average value AVE of the difference DCN is calculated (AVE=SD/n). In the following step 86, the cumulative value SD is cleared and, in the following step 87, the counter value C is also cleared. In the following step 88, it is judged whether the average value AVE is smaller than the predetermined value CN1. When AVE≧CN1, the catalyst 18 is judged not to be poisoned and the processing cycle is ended. Contrarily, when AVE<CN1, the catalyst 18 is judged to be poisoned and, then, the routine goes to step 89, where the poisoning flag is set. Then, the processing cycle is ended. The poisoning flag, which is reset initially, is set when the catalyst 18 is judged to be poisoned, and is reset again when the reactivation of the catalyst 18 is finished.

Figure 8:
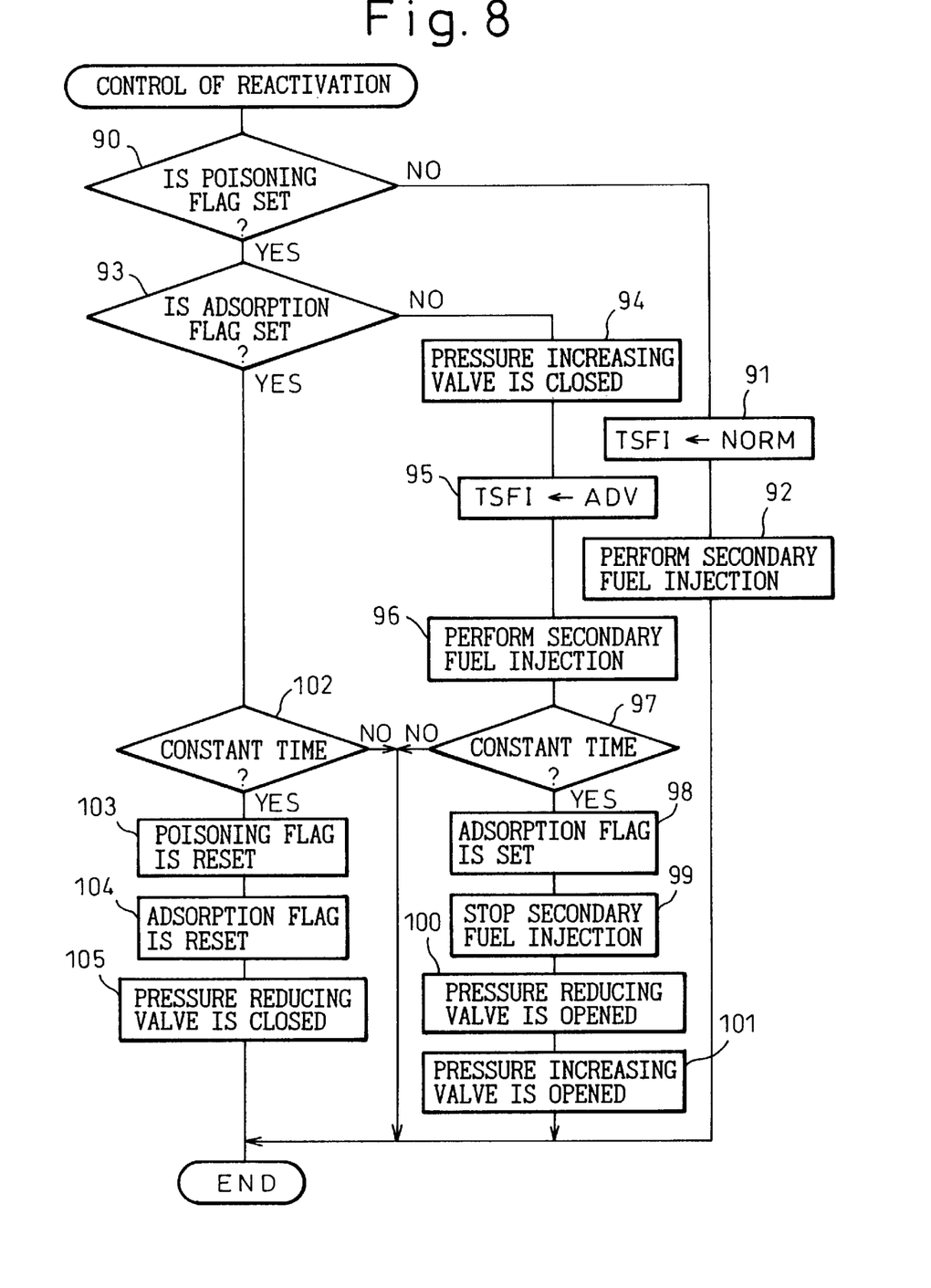
FIG. 8 shows a flowchart for controlling the reactivation according to the embodiment in FIG. 6.

Next, referring to FIG. 8 which shows a routine for controlling the reactivation of the catalyst 18, first, in step 90, it is judged whether the poisoning flag mentioned above is set. When the poisoning flag is reset, the routine goes to step 91, where the secondary fuel injection timing TSFI is set to NORM. This NORM is 150° crank angle after the top dead center of the compression stroke, for example. In the following step 92, the secondary fuel injection is performed. Then, the processing cycle is ended. Accordingly, the HC as the reducing agent is fed to the catalyst 18. Note that the pressure reducing valve 23 is closed and the pressure increasing valve 44 is closed at this time.

When the poisoning flag is set in step 90, the routine goes to step 93, where it is judged whether a adsorption flag is set. The adsorption flag is set when the adsorption of HC in the catalyst 18 is finished, and is reset otherwise. The adsorption flag is reset when it is the first time for the routine to go to step 93 after the poisoning flag is set. Thus, the routine goes to step 94, where the pressure increasing valve 44 is closed. The opening of the valve 44 at this time is set to an opening suitable for increasing the pressure in the casing 19 while maintaining the decrement of the engine output, due to the increase of the back pressure of the engine, within the allowable range, and is obtained in advance by experiment. In the following step 95, the secondary fuel injection timing TSFI is set to ADV. This ADV is advanced with respect to NORM, and is 90° crank angle after the top dead center of the compression stroke, for example. In the following step 96, the secondary fuel injection is performed. Accordingly, HC as the catalyst heating fuel is adsorbed in the catalyst 18, and the catalyst 18 is preheated.

In the following step 97, it is judged whether a constant time has passed from when the pressure increasing valve 44 is closed, i.e., whether the adsorption of HC in the adsorbent 46 is performed for the constant time. When the constant time has not passed, the processing cycle is ended. Contrarily, when the constant time has passed, it is judged that the HC sufficient to heat the catalyst 18 sufficiently is adsorbed in the adsorbent 46 and the routine goes to step 98, where the adsorption flag is set. In the following step 99, the secondary fuel injection is stopped. In the following step 100, the pressure reducing valve 23 is opened. In the following step 101, the pressure increasing valve 44 is opened. Then, the processing cycle is ended. Namely, when a large amount of HC is adsorbed in the adsorbent 46, the pressure increment in the casing 19 is stopped, and the pressure reduction in the casing is started.

When the adsorption flag is set, the routine goes from step 93 to step 102, where it is judged whether a constant time has passed from when the pressure reducing valve 23 is opened, i.e., whether the reactivation of the catalyst 18 is performed for the constant time. When the constant time has not passed, the processing cycle is ended. Contrarily, when the constant time has passed, the reactivation of the catalyst 18 is judged to be finished, and the routine goes to step 103, where the poisoning flag is reset. In the following step 104, the adsorption flag is also reset. In the following step 105, the pressure reducing valve 23 is closed.

In the embodiments mentioned above, the bypass pipe 21 is provided, the pressure reducing valve 23 is arranged in the bypass pipe 21, and the opening of the valve 23 is controlled to control the pressure in the casing 19 or, the pressure increasing valve 44 is arranged in the exhaust pipe 20 and the opening of the valve 44 is controlled to control the pressure in the casing 19. Alternatively, the pressure in the casing 19 may be controlled by arranging an EGR control valve for controlling the amount of the EGR gas in the EGR passage connecting the exhaust manifold 16 and the surge tank 11 to each other and controlling the opening of the EGR control valve. Further, alternatively, the pressure in the casing 19 may be controlled by arranging the turbo charger and controlling the opening of the waste-gate valve of the turbo charger.

According to the present invention, it is possible to provide a device for reactivating a catalyst of an engine capable of reactivating the catalyst sufficiently from the poisoning thereof, to thereby purify the exhaust gas sufficiently.

While the invention has been described by reference to specific embodiments chosen for purposes of illustration, it should be apparent that numerous modifications could be made thereto by those skilled in the art without departing from the basic concept and scope of the invention.

What is claimed is:

1. A device for reactivating a catalyst of an engine having an exhaust passage, the catalyst being housed in a catalyst casing arranged in the exhaust passage, the device comprising:

heating means which is able to heat the catalyst;

pressure reducing means which is able to reduce the pressure in the catalyst casing including an escaping passage branching off from the exhaust passage upstream of the catalyst casing that introduces a part of the exhaust gas to the escaping passage;

reactivating means for reactivating the catalyst by controlling the heating means and the pressure reducing means to heat the catalyst and reduce the pressure in the catalyst casing to release a sulphur containing component or a soluble organic fraction from the catalyst;

judging means included in the reactivating means for judging whether the catalyst is poisoned by a sulphur containing component or a soluble organic fraction; wherein the reactivating means reactivates the catalyst when the catalyst is judged to be poisoned.

2. A device according to claim 1, wherein a pressure reducing valve is arranged in the escaping passage, and wherein the pressure reducing valve is usually closed and is opened when the pressure in the catalyst casing is to be reduced.

3. A device according to claim 1, wherein the outlet of the escaping passage is connected to the exhaust passage downstream of the catalyst casing so that the escaping passage bypasses the catalyst casing.

4. A device according to claim 1, wherein the heating means comprises feeding means for feeding the catalyst heating fuel to the catalyst so that the catalyst heating fuel is burned in the catalyst to heat the catalyst.

5. A device according to claim 4, wherein the feeding means comprises a fuel injector arranged in the combustion chamber of the engine, and wherein the fuel injector secondarily injects fuel, for the engine, at the combustion stroke or the exhaust stroke of the engine, to feed the catalyst heating fuel to the catalyst.

6. A device according to claim 5, wherein the catalyst is able to reduce $NO_X$ in an oxidizing atmosphere including the reducing agent, wherein the fuel injector secondarily injects fuel of the engine at the combustion stroke or the exhaust stroke of the engine, to supply the reducing agent to reduce $NO_X$ by the reducing agent in the catalyst, and wherein the timing of the secondary fuel injection when the catalyst is to be heated is advanced with respect to the timing of the usual secondary fuel injection.

7. A device according to claim 4, wherein the feeding means comprises: an adsorbent arranged in the catalyst or in the exhaust passage upstream of the catalyst for adsorbing the catalyst heating fuel therein; supplying means for supplying the catalyst heating fuel to the adsorbent so that the catalyst heating fuel is adsorbed in the adsorbent before the reactivation of the catalyst; and desorbing means for desorbing the catalyst heating fuel from the adsorbent to feed the catalyst heating fuel to the catalyst when the catalyst is to be heated.

8. A device according to claim 7, wherein the supplying means comprises a fuel injector arranged in the combustion chamber of the engine, and wherein the fuel injector injects fuel of the engine secondarily at the combustion stroke or the exhaust stroke of the engine, to supply the catalyst heating fuel to the adsorbent.

9. A device according to claim 7, wherein the adsorbent is housed in an adsorbent casing which is arranged in the exhaust passage, the adsorbing capacity of the adsorbent becoming smaller as the pressure in the adsorbent casing becomes lower, wherein the desorbing means comprises means for reducing the pressure in the adsorbent casing to desorb the adsorbed catalyst heating fuel from the adsorbent to feed the catalyst heating fuel to the catalyst when the catalyst is to be heated.

10. A device according to claim 9, wherein the supplying means comprises pressure increasing means for increasing the pressure in the adsorbent casing, and wherein the pressure increasing means increases the pressure in the adsorbent casing when the supplying means supplies the catalyst heating fuel to the adsorbent.

11. A device according to claim 10, wherein the pressure increasing valve comprises a pressure increasing valve arranged in the exhaust passage downstream of the adsorbent casing, and wherein the pressure increasing valve is usually opened and is closed when the pressure in the adsorbent catalyst casing is to be increased.

12. A device according to claim 7, wherein the adsorbent is housed in the catalyst casing, the adsorbing capacity of the adsorbent becoming smaller as the pressure in the catalyst casing becomes lower, and wherein the adsorbed catalyst heating fuel is desorbed from the adsorbent and is fed to the catalyst when the pressure in the catalyst casing is reduced to reactivate the catalyst.

13. A device according to claim 7, wherein the adsorbent comprises a porous material having almost no catalytic function.

14. A device according to claim 13, wherein the adsorbent is comprised of silica.

15. A device according to claim 1, wherein the judging means judges whether the catalyst is poisoned based on the temperature of the exhaust gas discharged from the catalyst.

16. A device according to claim 15, wherein the judging means comprises a first temperature sensor arranged in the exhaust passage adjacent to the inlet of the catalyst for detecting the temperature of the exhaust gas flowing to the catalyst, and a second temperature sensor arranged in the exhaust passage adjacent to the outlet of the catalyst for detecting the temperature of the exhaust gas discharged from the catalyst, and wherein the catalyst is judged to be poisoned when the difference between the temperature of the exhaust gas discharged from the catalyst and the temperature of the exhaust gas flowing to the catalyst is smaller than a first predetermined value.

17. A device according to claim 16, wherein the first predetermined value is set based on the engine operating condition.

18. A device according to claim 1, wherein the judging means judges whether the catalyst is poisoned based on the concentration of $NO_X$ in the exhaust gas discharged from the catalyst.

19. A device according to claim 18, wherein the judging means comprises a first $NO_X$ concentration sensor arranged in the exhaust passage adjacent to the inlet of the catalyst for detecting the concentration of $NO_X$ in the exhaust gas flowing to the catalyst, and a second $NO_X$ concentration sensor arranged in the exhaust passage adjacent to the outlet of the catalyst for detecting the concentration of $NO_X$ in the exhaust gas discharged from the catalyst, and wherein the catalyst is judged to be poisoned when the difference between the concentration of $NO_X$ in the exhaust gas discharged from the catalyst and the concentration of $NO_X$ in the exhaust gas flowing to the catalyst is smaller than a second predetermined value.

20. A device according to claim 1, wherein the catalyst comprises a porous carrier selected from zeolite, ferrierite, mordenite, alumina, silica-alumina, activated carbon, and titania.

21. A device according to claim 1, wherein the catalyst is comprised of a precious metal including platinum, palladium, rhodium, and iridium, or a transition metal including iron, copper, cobalt, and nickel, which is carried on a porous carrier.

22. A device according to claim 1, wherein the air-fuel mixture is burned in the combustion chamber of the engine with an excess of air.

* * * * *